(12) United States Patent
Thomas

(10) Patent No.: US 7,295,602 B2
(45) Date of Patent: Nov. 13, 2007

(54) AUTO-NEGOTIATION OF TRANSCEIVER ROLES IN COMMUNICATION SYSTEMS

(75) Inventor: Michaël Andries Thomas, Antwerp (BE)

(73) Assignee: Alcatel, Paris (FR)

( * ) Notice: Subject to any disclaimer, the term of this patent is extended or adjusted under 35 U.S.C. 154(b) by 710 days.

(21) Appl. No.: 10/796,125

(22) Filed: Mar. 10, 2004

(65) Prior Publication Data
US 2004/0180629 A1   Sep. 16, 2004

(30) Foreign Application Priority Data
Mar. 11, 2003   (EP)   ................... 03290595

(51) Int. Cl.
*H04B 1/38* (2006.01)
(52) U.S. Cl. ...................... 375/222; 375/259
(58) Field of Classification Search ............... 375/222, 375/219, 259
See application file for complete search history.

(56) References Cited
U.S. PATENT DOCUMENTS
6,751,254 B1 * 6/2004 Palm .......................... 375/222
6,950,459 B1 * 9/2005 Palm .......................... 375/222
2005/0021835 A1 * 1/2005 Palm .......................... 709/237

FOREIGN PATENT DOCUMENTS
EP   0 963 079 A2   12/1999

OTHER PUBLICATIONS
"G. 994. I Handshake procedures for Digital Subscriber Line Transceivers" ITU-T Recommendation G.994.1, Feb. 2001, pp. 1-92, XP002196569.

* cited by examiner

Primary Examiner—Temesghen Ghebretinsae
Assistant Examiner—Juan Alberto Torres
(74) Attorney, Agent, or Firm—Sughrue Mion, PLLC

(57) ABSTRACT

A transceiver unit freely and automatically chooses whether it will operate as a central unit or as a remote unit, depending on the capabilities of the peer transceiver unit, which it is connected to. The transceiver unit listens first to any signal the peer may transmit to initiate the handshake procedure. Such a signal would de-facto identify the peer as a remote unit or as a central unit and would allow the transceiver unit to select the appropriate role. If no signal is detected, the transceiver unit tries to initiate the handshake procedure and waits for the corresponding signal from the peer. The transceiver unit may try to initiate the handshake procedure as a remote unit only, or it may try both as a central unit and as a remote unit.

9 Claims, 2 Drawing Sheets

AUTO-NEGOTIATION OF TRANSCEIVER ROLES IN COMMUNICATION SYSTEMS

BACKGROUND OF THE INVENTION

The present invention relates to a transceiver unit comprising:
- a receiver unit adapted to detect from a physical medium a first downstream handshake initiation signal and a first upstream handshake initiation signal,
- a transmitter unit adapted to transmit over said physical medium a second upstream handshake initiation signal,
- a self identification module adapted to identify said transceiver unit as a central unit or as a remote unit.

Such a transceiver unit is already known in the art, e.g. from the recommendation entitled "Handshake Procedures for Digital Subscriber Line (DSL) Transceivers", reference G.994.1, pre-published by the International Telecommunication Union (ITU) on February 2001.

This recommendation provides a flexible mechanism for Digital Subscriber Line (xDSL) transceivers to exchange capabilities and to select a common mode of operation. This is known as the handshake procedure. With respect to the handshake procedure, a transceiver unit is referred to as an HandShake Termination Unit (HSTU).

A transceiver unit sited at a Central location (e.g., a central office) is referred to as a HSTU-C. A transceiver unit sited at a Remote location (e.g., customer premises) is referred to as a HSTU-R. Downstream refers to signals flowing from the central unit to the remote unit, upstream refers to signals flowing from the remote unit to the central unit.

The handshake procedure begins with the transmission and detection of specific handshake initiation and confirmation signals, the composition and the timing of which being specified in §11.1 (p. 78-79) for duplex mode of operation, and in §11.2 (p. 79-80) for half-duplex mode of operation.

Transmit and receive spectra, signal composition and timing, state transition diagram, etc, are different for a central unit and a remote unit. A transceiver unit shall thus identify itself as a central unit or (exclusive) as a remote unit prior to the beginning of the handshake procedure. This is usually achieved by means of hardly/softly configured data, e.g. by reading from a specific location in memory the type of housing equipment wherein the transceiver unit is embedded.

The prior art solution requires careful equipment selection and/or manual equipment configuration. This solution is even more tedious if a network element shall operate in some respects as a central unit, and in other respects as a remote unit, e.g. an access concentrator at an intermediate hierarchical level.

SUMMARY OF THE INVENTION

It is an object of the present invention to allow a transceiver unit to freely and automatically choose whether it will operate as a central unit or as a remote unit, depending on the capabilities of the peer transceiver unit, which it is connected to.

According to the invention, this object is achieved due to the fact that said self identification module is coupled to said receiver unit and said transmitter unit, and is further adapted to:
- wait for detection of any of said first downstream handshake initiation signal and said first upstream handshake initiation signal within a first time interval,
- request said transmitter unit to transmit said second upstream handshake initiation signal if none of said first downstream handshake initiation signal and said first upstream handshake initiation signal is detected within said first time interval, and wait for detection of said first downstream handshake initiation signal within a second time interval,
- identify said transceiver unit as a remote unit upon detection of said first downstream handshake initiation signal within said first time interval or within said second time interval, and
- identify said transceiver unit as a central unit upon detection of said first upstream handshake initiation signal within said first time interval.

Once the transceiver unit has identified itself as a remote unit or as a central unit, it carries on the handshake procedure as a remote unit or as a central unit respectively would do.

The present invention is applicable to whatever type of transceiver units exchanging signals over a physical medium for shaking each other's hand, e.g. subsequent to an equipment start-up.

A transceiver unit according to the invention is capable of connecting and inter-operating with any of the following peers:
- a peer capable of operating as a central unit only, and which intends to initiate the handshake procedure,
- a peer is capable of operating as a central unit only, and which is waiting for a signal to enable the communication,
- a peer capable of operating both as a central unit and as a remote unit, yet is hardly/softly configured as a central unit, and which intends to initiate the handshake procedure,
- a peer capable of operating both as a central unit and as a remote unit, yet is hardly/softly configured as a central unit, and which is waiting for a signal to enable the communication,
- a peer capable of operating as a remote unit only, and which intends to initiate the handshake procedure,
- a peer capable of operating both as a central unit and as a remote unit, yet is hardly/softly configured as a remote unit, and which intends to initiate the handshake procedure,
- a peer capable of operating both as a central unit and as a remote unit, and which selects its operating mode according to the present invention.

A further level of inter-operability can be achieved by a transceiver unit in which the receiver unit is further adapted to detect from said physical medium an upstream handshake confirmation signal, said transmitter unit is further adapted to transmit over said physical medium a second downstream handshake initiation signal, and self identification module is further adapted to:
- request said transmitter unit to transmit said second downstream handshake initiation signal if none of said first downstream handshake initiation signal and said first upstream handshake initiation signal is detected within said first time interval, and wait for detection of said upstream handshake confirmation signal within a third time interval,
- identify said transceiver unit as a central unit upon detection of said upstream handshake confirmation signal within said third time interval.

This transceiver unit is further capable of connecting and inter-operating with any of the following peers:

a peer, which is capable of operating as a remote unit only, and which is waiting for a signal to enable the communication, a peer, which is capable of operating both as a central unit and as a remote unit, yet is hardly/softly configured as a remote unit, and which is waiting for a signal to enable the communication.

In the sequence of execution, the self identification module is further adapted to request said transmitter unit to transmit said second downstream handshake initiation signal if said first downstream handshake initiation signal is not detected within said second time interval.

That is to say, no signal is transmitted first, and said first downstream handshake initiation signal or said first upstream handshake initiation signal are awaited, next said second upstream handshake initiation signal is transmitted, and said first downstream handshake initiation signal is awaited, and finally said second downstream handshake initiation signal is transmitted, and said upstream handshake confirmation signal is awaited.

If none of the expected signals is detected, the cycle is repeated until a connection can be made.

Said self identification module may be further adapted to request said transmitter unit to transmit said second upstream handshake initiation signal if said first upstream handshake confirmation signal is not detected within said third time interval.

That is to say, no signal is transmitted, and said first downstream handshake initiation signal or said first upstream handshake initiation signal are awaited, next said second downstream handshake initiation signal is transmitted, and said upstream handshake confirmation signal is awaited, and finally said second upstream handshake initiation signal is transmitted, and said first downstream handshake initiation signal is awaited.

If none of the expected signals is detected, the cycle is repeated until a connection can be made.

In the issue of signal collision, e.g. when transceiver units at both sides are switched on simultaneously, said self identification module may be further adapted to wait for a random or pseudo-random period of time if none of the expected signals is detected.

The probability that signals collide decreases as the transceiver unit enters a new cycle.

The time at which this random or pseudo-random period of time starts is left undetermined, e.g. at the end of said second time interval.

What said self identification module does during this random or pseudo-random period of time is also left undetermined, e.g. waiting for said first downstream handshake initiation signal or said first upstream handshake initiation signal.

The length of any of said first time interval or said second time interval may be a random or pseudo-random number.

The probability that signals collide remains equally low, even during the first cycle.

Other characterizing embodiments of the present invention are applicable to a xDSL transceiver unit In duplex mode, said first downstream handshake initiation signal and said second downstream handshake initiation signal are C-TONES signals, said first upstream handshake initiation signal and said second upstream handshake initiation signal are R-TONES-REQ signals, and said upstream handshake confirmation signal is a R-TONE1 signal.

A definition of C-TONES, R-TONES-REQ and R-TONE1 signals is given in the cited reference.

It is noteworthy that C-TONES and R-TONES-REQ signals are transmitted without interruption until the corresponding signal is detected, preventing meanwhile the transceiver unit from detecting any signal in the downstream or upstream band respectively.

In half-duplex mode, said first downstream handshake initiation signal and said second downstream handshake initiation signal are C-TONES signals, said first upstream handshake initiation signal and said second upstream handshake initiation signal are R-TONES-REQ signals, and said upstream handshake confirmation signal is a R-FLAG1 signal.

A definition of R-FLAG1 signal is given in the cited reference.

It is to be noticed that the term 'comprising', also used in the claims, should not be interpreted as being restricted to the means listed thereafter. Thus, the scope of the expression 'a device comprising means A and B' should not be limited to devices consisting only of components A and B. It means that with respect to the present invention, the relevant components of the device are A and B.

Similarly, it is to be noticed that the term 'coupled', also used in the claims, should not be interpreted as being restricted to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

BRIEF DESCRIPTION OF THE DRAWINGS

The above and other objects and features of the invention will become more apparent and the invention itself will be best understood by referring to the following description of an embodiment taken in conjunction with the accompanying drawings wherein.

DETAILED DESCRIPTION OF THE INVENTION

Figure 1:
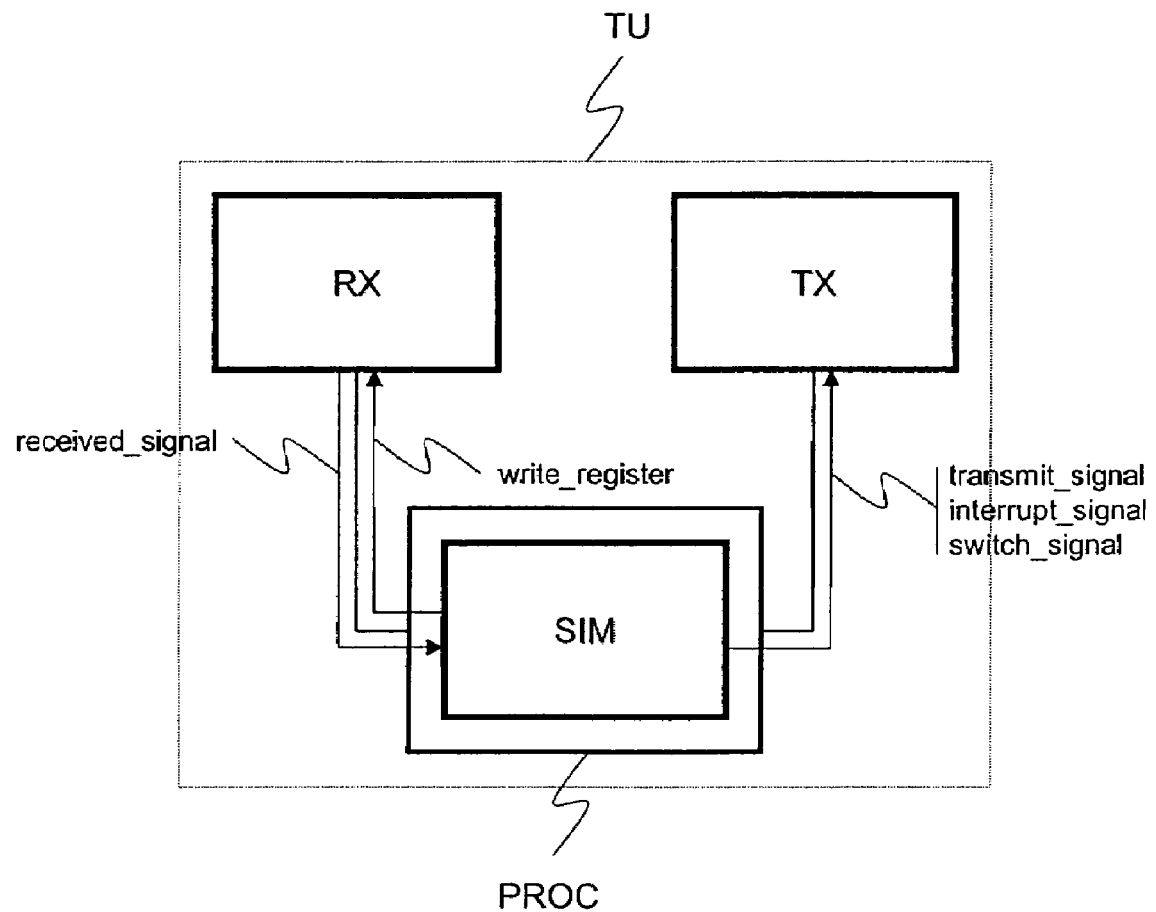
FIG. 1 represents a block diagram of a transceiver unit with respect to the present invention.

As depicted in FIG. 1, a transceiver unit TU comprises the following physical elements:
 a processing unit PROC,
 a receiver unit RX,
 a transmitter unit TX.

The transceiver unit TU further comprises all the necessary elements as known to the skilled person. Those elements are not worth being mentioned with respect to the present invention.

The processing unit PROC is coupled to both the receiver unit RX and the transmitter unit TX, e.g. via an address/data bus.

In the preferred embodiment of the present invention, the transceiver unit TU is a xDSL transceiver unit using the 4.3125 kHz signalling family, and operating in duplex mode. However, the present invention is not limited thereto.

With respect to the present invention, the receiver unit RX is able to:
 listen to the A43 upstream carrier set, which comprises the frequency indices 9, 17 and 25,
 listen to the A43 downstream carrier set, which comprises the frequency indices 40, 56 and 64, detect over the A43 downstream carrier set the reception of a C-TONES signal, detect over the A43 upstream carrier set the reception of an R-TONES-REQ signal, detect over the A43 upstream carrier set the reception of an R-TONE1 signal.

The receiver unit RX notifies the reception of a signal to the processing unit PROC (see FIG. 1: received_signal).

The receiver unit RX further provides the processing unit PROC with a programmable register REG (not shown) which allows the processing unit PROC to select which carrier sets (upstream, downstream or both) shall be listened to (see FIG. 1: write_register).

With respect to the present invention, the transmitter unit TX is able to:

transmit a C-TONES signal over the A43 downstream carrier set, transmit an R-TONES-REQ signal over the A43 upstream carrier set.

The signals are transmitted/interrupted/switched upon request from the processing unit PROC (see FIG. 1: transmit_signal, interrupt_signal, switch_signal).

The processing unit PROC houses a self identification module SIM, which communicates with both the receiver unit RX and the transmitter unit TX, and adapted to identify the transceiver unit TU as a central unit or as a remote unit in accordance with the present invention.

Figure 2:
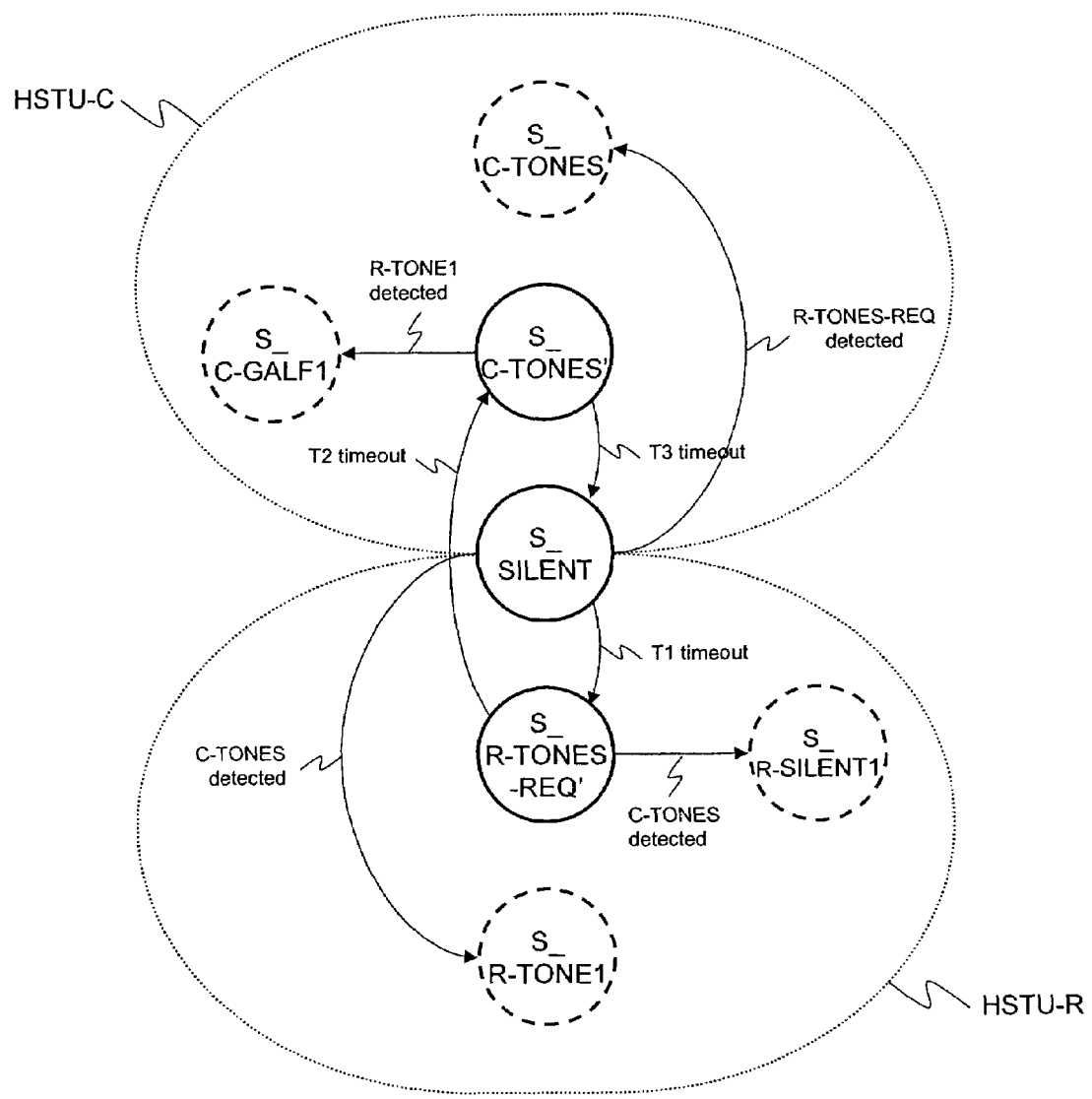
FIG. 2 represents a state transition diagram of a self identification module.

The self identification module SIM implements a finite state machine, a state transition diagram of which is plotted in FIG. 2. In the state transition diagram, the states related to a central unit are embraced by the ellipse HSTU-C, the states related to a remote unit are embraced by the ellipse HSTU-R. Plain lines are used for states, wherein the HSTU has not yet been identified as an HSTU-R or as an HSTU-C, and for which a transition to the opposite side (possibly via the silent state) is still possible. Dash lines are used for standardized G.994.1 states: the HSTU has been identified as an HSTU-R or (exclusive) as an HSTU-C, and since adheres to the G.994.1 respective signal composition and timing.

Initially, the self identification module SIM is in the state S_SILENT (see FIG. 2). In this state, the self identification module SIM programs the register REG for the receiver unit RX to listen both the A43 upstream carrier set and the A43 downstream carrier set. Thereupon, the self identification module SIM starts a first timer T1.

The following events are expected in the state S_SILENT:

a C-TONES is detected, a R-TONES-REQ is detected, the timer T1 has expired.

If a C-TONES signal is detected, the self identification module SIM identifies the transceiver unit TU as an HSTU-R and jumps to the applicable G.994.1 state machine, presently S_R-TONE1 G.994.1 HSTU-R state.

If a R-TONES-REQ signal is detected, the self identification module SIM identifies the transceiver unit TU as an HSTU-C and jumps to the applicable G.994.1 state machine, presently S_C-TONES G.994.1 HSTU-C state.

If the timer T1 expires, the self identification module SIM enters the state S_R-TONES-REQ'.

In the state S_R-TONES-REQ', the self identification module SIM request the transmitter TX to transmit the signal R-TONES-REQ until further notification, and programs the register REG for the receiver unit RX to listen the A43 downstream carrier set only. Thereupon, the self identification module SIM starts a second timer T2.

The following events are expected in the state S_R-TONES_REQ':

a C-TONES signal is detected, the timer T2 has expired.

If a C-TONES signal is detected, the self identification module SIM identifies the transceiver unit TU as an HSTU-R and jumps to the applicable G.994.1 state machine, presently S_R-SILENT1 G.994.1 HSTU-R state.

If the timer T2 expires, the self identification module SIM enters the state S_C-TONES'.

In the state S_C-TONES', the self identification module SIM requests the transmitter TX to transmit the signal C-TONES until further notification, and programs the register REG for the receiver unit RX to listen the A43 upstream carrier set only. Thereupon, the self identification module SIM starts a third timer T3.

The following events are expected in the state S_C-TONES':

an R-TONE1 signal is detected, the timer T3 has expired.

If a R-TONE1 signal is detected, the self identification module SIM identifies the transceiver unit TU as an HSTU-C and jumps to the applicable G.994.1 state machine, presently S_C-GALF1 G.994.1 HSTU-C state.

If the timer T3 expires, the self identification module SIM waits for a random period of time.

For every state, any unexpected event shall force the self identification module SIM to abort the self identification procedure and to re-enter the initial state S_SILENT.

In an alternative embodiment, the transceiver unit TU supports both 4 kHz and 4.3125 kHz signalling families, and/or supports more than one carrier set (that is to say, more than one DSL modes of operation).

In an alternative embodiment, there is no additional random period of time awaited. Instead, any of T1, T2 or T3's duration is a random or pseudo-random number.

A final remark is that embodiments of the present invention are described above in terms of functional blocks. From the functional description of these blocks, given above, it will be apparent for a person skilled in the art of designing electronic devices how embodiments of these blocks can be manufactured with well known electronic components. A detailed architecture of the contents of the functional blocks hence is not given.

While the principles of the invention have been described above in connection with specific apparatus, it is to be clearly understood that this description is made only by way of example and not as a limitation on the scope of the invention, as defined in the appended claims.

The invention claimed is:

1. A transceiver unit comprising:
   a receiver unit adapted to detect from a physical medium a first downstream handshake initiation signal and a first upstream handshake initiation signal,
   a transmitter unit adapted to transmit over said physical medium a second upstream handshake initiation signal, and
   a self identification module adapted to identify said transceiver unit as a central unit or as a remote unit,
   characterized in that said self identification module is coupled to said receiver unit and said transmitter unit, and is further adapted to:
   wait for detection of any of said first downstream handshake initiation signal and said first upstream handshake initiation signal within a first time interval,
   request said transmitter unit to transmit said second upstream handshake initiation signal when none of said first downstream handshake initiation signal and said first upstream handshake initiation signal is detected within said first time interval, and wait for detection of said first downstream handshake initiation signal within a second time interval, identify said transceiver unit as a remote unit upon detection of said first downstream handshake initiation signal within said first time interval or within said second time interval, and identify said transceiver unit as a central unit upon detection of said first upstream handshake initiation signal within said first time interval.

2. A transceiver unit according to claim 1, characterized in that said receiver unit is further adapted to detect from said physical medium an upstream handshake confirmation signal, wherein said transmitter unit is further adapted to transmit over said physical medium a second downstream handshake initiation signal, and said self identification module is further adapted to:

request said transmitter unit to transmit said second downstream handshake initiation signal when none of said first downstream handshake initiation signal and said first upstream handshake initiation signal is detected within said first time interval, and wait for detection of said upstream handshake confirmation signal within a third time interval, and identify said transceiver unit as a central unit upon detection of said upstream handshake confirmation signal within said third time interval.

3. A transceiver unit according to claim 2, characterized in that said self identification module is further adapted to request said transmitter unit to transmit said second downstream handshake initiation signal when said first downstream handshake initiation signal is not detected within said second time interval.

4. A transceiver unit according to claim 2, characterized in that said self identification module is further adapted to request said transmitter unit to transmit said second upstream handshake initiation signal when said first upstream handshake confirmation signal is not detected within said third time interval.

5. A transceiver unit according to claim 1, characterized in that said self identification module is further adapted to wait for a random or pseudo-random period of time when none of said first downstream handshake initiation signal and said first upstream handshake initiation signal is detected within said first time interval, and if said first downstream handshake initiation signal is not detected within said second time interval.

6. A transceiver unit according to claim 1, characterized in that a length of any of said first time interval or said second time interval is a random or pseudo-random number.

7. A transceiver unit according to claim 1, characterized in that said transceiver unit is a digital subscriber line transceiver unit, and in that said first downstream handshake initiation signal is a C-TONES signal according to ITU recommendation G.994.1, said first upstream handshake initiation signal and said second upstream handshake initiation signal are R-TONES-REQ signals according to ITU recommendation G.994.1.

8. A transceiver unit according to claim 2, characterized in that said transceiver unit is a digital subscriber line transceiver unit, and in that said first downstream handshake initiation signal and said second downstream handshake initiation signal are C-TONES signals according to ITU recommendation G.994.1, said first upstream handshake initiation signal and said second upstream handshake initiation signal are R-TONES-REQ signals according to ITU recommendation G.994.1, and said upstream handshake confirmation signal is a R-TONE1 signal according to ITU recommendation G.994.1.

9. A transceiver unit according to claim 2, characterized in that said transceiver unit is a digital subscriber line transceiver unit, and in that said first downstream handshake initiation signal and said second downstream handshake initiation signal are C-TONES signals according to ITU recommendation G.994.1, said first upstream handshake initiation signal and said second upstream handshake initiation signal are R-TONES-REQ signals according to ITU recommendation G.994.1, and said upstream handshake confirmation signal is a R-FLAG1 signal according to ITU recommendation G.994.1.

* * * * *

UNITED STATES PATENT AND TRADEMARK OFFICE
CERTIFICATE OF CORRECTION

| | | |
|---|---|---|
| PATENT NO. | : 7,295,602 B2 | Page 1 of 1 |
| APPLICATION NO. | : 10/796125 | |
| DATED | : November 13, 2007 | |
| INVENTOR(S) | : Thomas | |

It is certified that error appears in the above-identified patent and that said Letters Patent is hereby corrected as shown below:

The title page item (75), should read -- Michaël Andries Thomas BECK --.

Signed and Sealed this

Twenty-first Day of October, 2008

JON W. DUDAS
*Director of the United States Patent and Trademark Office*